Feb. 22, 1949.  O. O. OAKS  2,462,217
VALVE FOR THERMAL SYSTEMS
Filed July 3, 1945  3 Sheets-Sheet 1

INVENTOR.
ORION O. OAKS
BY
ATTORNEY

Feb. 22, 1949.  O. O. OAKS  2,462,217
VALVE FOR THERMAL SYSTEMS
Filed July 3, 1945  3 Sheets-Sheet 2
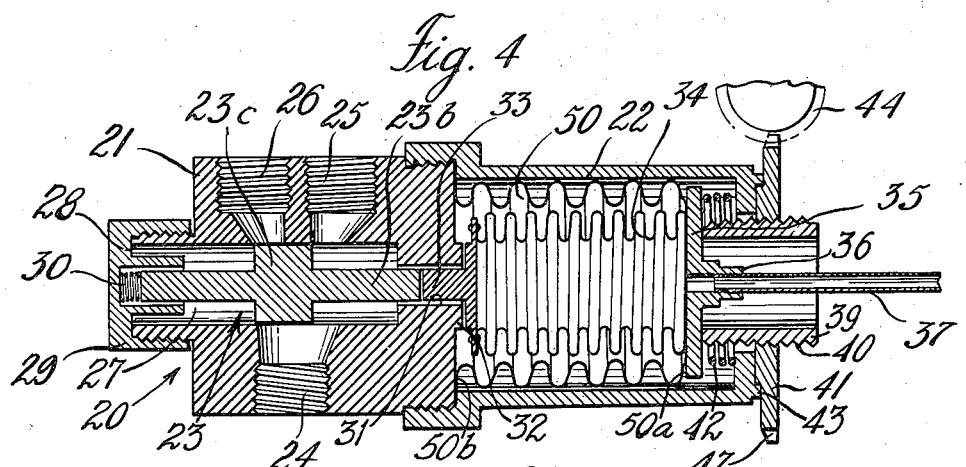
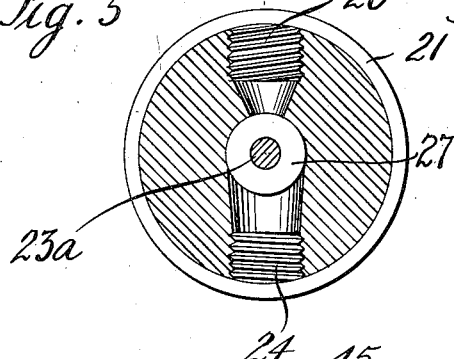
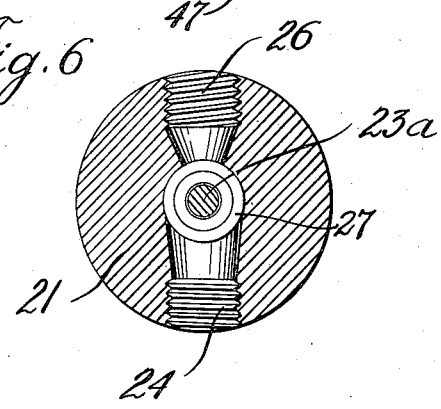
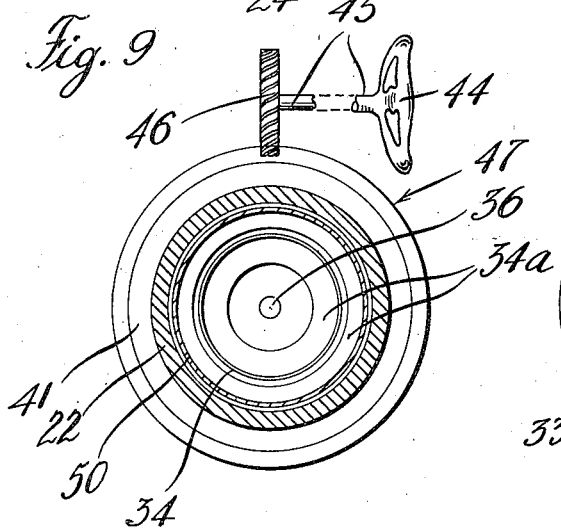
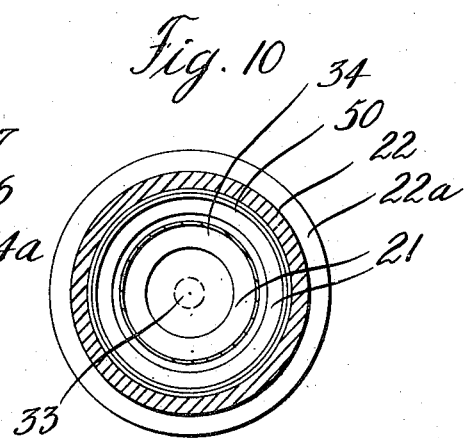
INVENTOR.
ORION O. OAKS
BY
ATTORNEY

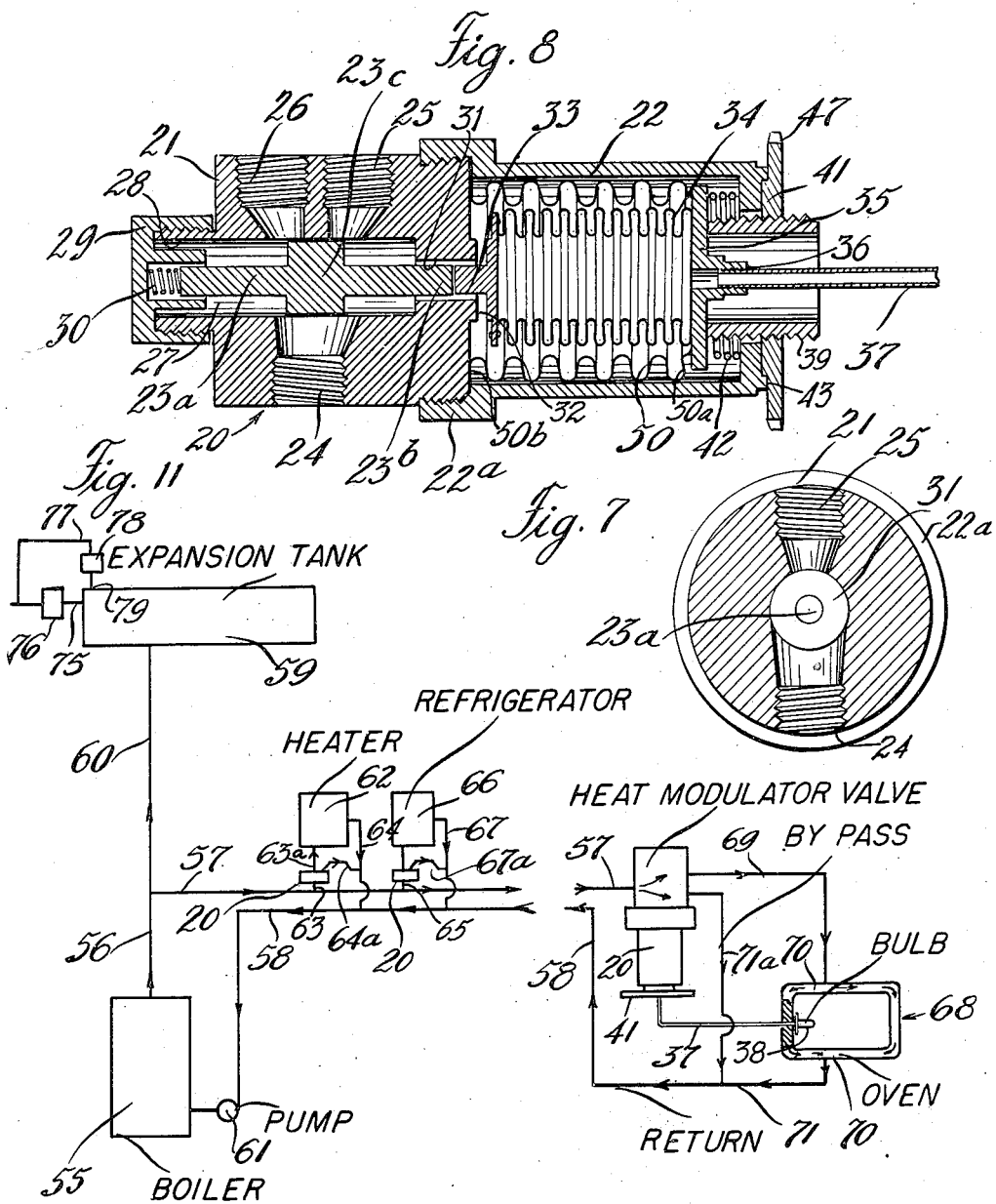

Patented Feb. 22, 1949

2,462,217

UNITED STATES PATENT OFFICE 2,462,217

VALVE FOR THERMAL SYSTEMS

Orion O. Oaks, Summit, N. J., assignor, by mesne assignments, to Thermal Liquids, Inc., New York, N. Y., a corporation of Delaware Application July 3, 1945, Serial No. 603,056

1 Claim. (Cl. 236—99)

The invention relates to modulator valves.

Preferred embodiments of the invention are particularly applicable to systems employing a heating medium which is circulated through the system and serving to furnish heat to one or more instrumentalities requiring heating in the use of the same.

In the most preferred utilization of the inventive concept such system is employed as a common means for the supply of heat to the full gamut of instrumentalities comprised in any given installation. Thus, with particular reference to a home, such system includes a single original source of heat, such as a coal- or oil- or gas-fired boiler or a suitably fired furnace and the employment as the heating medium of a liquid possessing the attributes of maintaining its liquid phase without development of its gaseous phase for the full range of heating required by the various instrumentalities embraced in the system, and which medium does not convert to its solid phase under the condition of minimum atmospheric temperature in the circumstance that the temperature within the home or other building in which the system is installed, may assume the outdoor temperature. Illustrative of such generic arrangement, such system includes suitable units or other instrumentalities for heating the interior of the home or other building, for operating a refrigerator, for supplying controlled ranges of heat, for simmering, cooking, frying, baking, broiling and the like in the preparation of food; also for the generation of steam in actuating an electrical generator for the supply of electricity for lighting purposes, or for operating a pump for the supply of water from a well, or for general power purposes, etc.

Such heating medium advantageously possesses the additional attributes of non-toxity, non-poisonous and non-irritation to humans or animals, immunity to wood and other materials employed in the construction of a house or other building, and like attributes in the circumstance of leakage of the medium from the piping of the system.

Illustrative of such heating medium are tetracresylsilicate, tricresylphosphate and the like.

Implementing such generic purposes and objects, the present invention provides valve means suitably connected with the main lines of the system and regulated manually or otherwise to divert the flow of the heating medium to any particular instrumentality embraced in the system without interrupting the continuity of flow of the heating medium in the system.

Preferred embodiments of such valve means comprise regulatable means controlling thermostatic responsive means whereby the range of temperature within any particular instrumentality is predeterminedly controlled.

Specifically, preferred types of such valve means, the subject of the instant application, are of the modular type, and comprise a valve body provided with an inflow port, two outflow ports, a movable valve member controlling the relative flow of the heating medium through such outflow ports, and regulatable means for pre-setting the range of temperature supplied to any individual instrumentality served by the system. In such arrangement the heating medium is led off from the main line through by-pass piping connected to the inflow port of the valve means, one of the outflow ports of the valve means being connected by piping in return to the main line, the other outflow port being connected by piping to the inlet means of the one or more heating coils of such instrumentality, the outlet means of such coils being connected by piping in return to the main line.

A particular feature of the modulator valve resides in the provision of means for actuating the movable valve member without the employment of any movable part or parts which extend exteriorly of the modulator valve, and without the employment of packing, stuffing boxes or the like. Pursuant to the invention, all joints are self-sealed, at all stages of operation, thus ensuring against leakage and consequent loss of the thermal medium, as well as precluding injury to persons, damage to property, or other disadvantageous effects.

In the employment of the system for the average home the range of temperature required by the instrumentalities served by the system varies from 200° F. to 600° F.

As illustrative of a suitable liquid applicable as the thermal medium of the system, tetracresylsilicate has a specific gravity of 1.12, specific heat .45, boiling point 817° F. at atmospheric pressure, is liquid from —65° F. (at which it is viscous) to 750° F., nontoxic, and noncorrosive to iron, steel, brass and copper.

The system is also applicable as the central heat source for a group of neighboring houses.

Further features and objects of the invention will be more fully understood from the following detailed description and the accompanying drawings, in which:

Fig. 4 is a longitudinal central sectional view corresponding to Fig. 3, the movable valve member, however, being in a position wholly restricting the flow of the heating liquid to the concerned instrumentality, and affording full flow of the heating liquid in its return to the main circuit.

Fig. 5 is a transverse sectional view taken on line 5—5 of Fig. 3.

Fig. 6 is a transverse sectional view taken on line 6—6 of Fig. 3.

Fig. 7 is a transverse sectional view taken on line 7—7 of Fig. 3.

Fig. 8 is a longitudinal central sectional view similar to Figs. 3 and 4, but showing the movable valve member at an intermediate position, affording partial flow of the heating liquid to the instrumentality served thereby and partial flow of the heating liquid in return to the main circuit.

Fig. 9 is a transverse sectional view on line 9—9 of Fig. 3.

Fig. 10 is a transverse sectional view on line 10—10 of Fig. 3.

Fig. 11 is a diagrammatic view indicating the circuit of the heating liquid; as shown such circuit includes a boiler serving as the heat source, a main line of piping, an expansion tank, diverting or by-pass lines running respectively to a convection heater, refrigerator, etc., and in particular illustrating the modulator valve controlling the heating of an oven.

Figure 1:
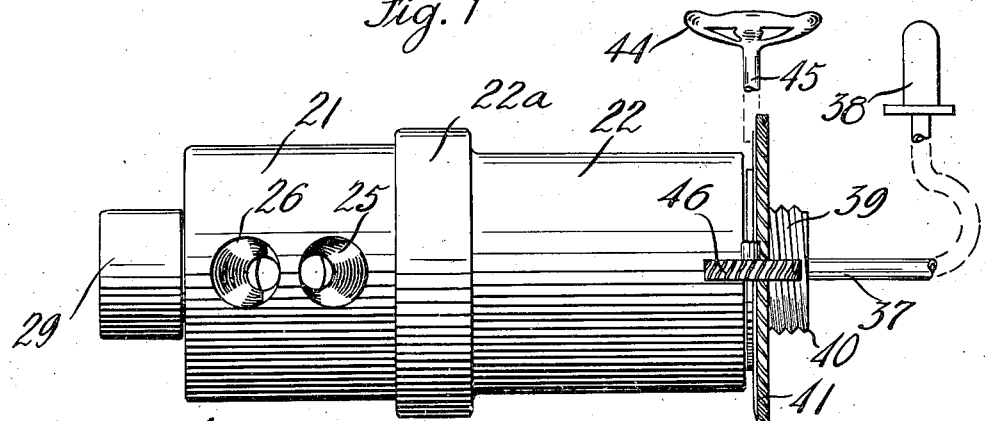
Fig. 1 is an elevational view of a preferred embodiment of modulator valve pursuant to the invention. This view indicates the association with the modulator valve of a thermostatic bulb controlling the temperature of the instrumentality served by the modulator valve.

Referring to the drawings, the preferred embodiment of the modulator valve designated generally 20 comprises a two-part casing 21, 22; the casing 21 enclosing the movable valve member 23; the casing 22 encloses mechanism for actuating the movable valve member, as will later appear.

The port 24 of the casing 21 serves as the inflow for the heating liquid led by suitable piping from the main circuit, referred to more fully hereinafter. The port 25 serves as the outlet leading through suitable piping in return to the main circuit. The port 26 serves as the outlet connected by suitable piping to the heating coil or coils of the instrumentality, such as an oven, to be controlled by the modulator valve. The movable valve member 23 comprises oppositely directed stems 23a, 23b, extending in opposite directions and respectively secured to a more or less centrally disposed valve plug element 23c, the outer periphery of which conforms closely to the periphery of the bore 27 which extends substantially centrally within and longitudinally of the casing 21. Desirably, the bore 27 is of circular configuration, as shown, but may be of other suitable configuration; the periphery of the plug element 23c is of corresponding configuration and dimensioned to make a close but sliding fit with the faces of the bore 27.

The stem 23a is received within and guided by the hollow recess 28 shown formed within the cap 29 and adjacent the outer end of the casing 21. The cap 29 serves to close the outer end of the casing 21. Within the recess 28 is an expansile spring 30 which serves as a return spring for the movable valve member 23. As shown, the cap 29 is sealingly secured to the outer end of the casing 21, as by mating screw-threaded connection with the extension 21a of the casing 21, thereby affording also adjustment of the pressure of the spring 30. The stem 23b of the movable valve member extends within the bore 31 which passes through the inner end of the casing 21 and serves to guide the stem 23b.

The casing 21 is provided at its inner end, i. e., adjacent the bore 31, with a perforated boss 32, which serves to receive the plunger 33 of the bellows or like form of self-expandable and self-contractable container 34 or equivalent valve actuating device which is associated with suitable means responsive to temperature changes, referred to more fully hereinafter.

The casing 22 is stationarily connected with the casing 21, as by screw-threaded connection of its bell end 22a.

Figure 3:
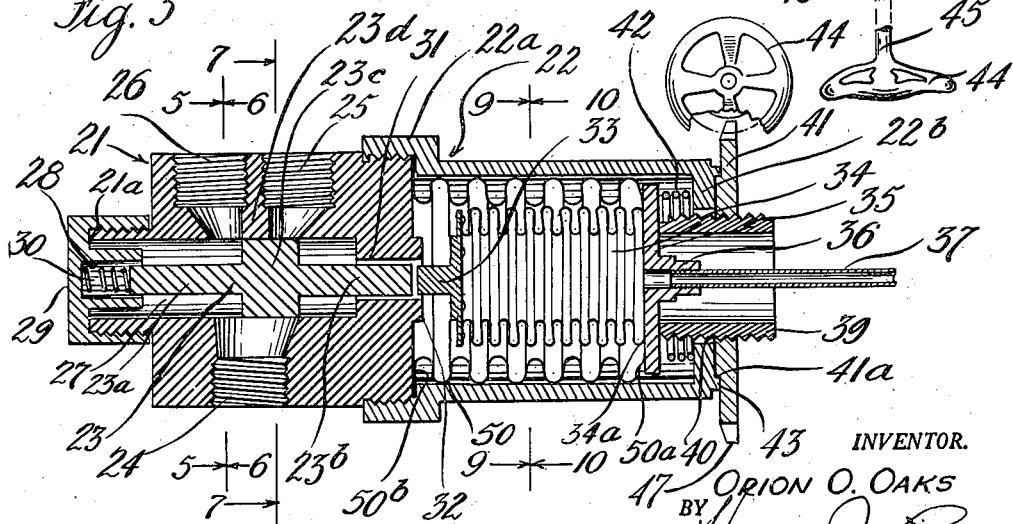
Fig. 3 is a central longitudinal sectional view of the modulator valve in its position as shown in Fig. 2. The movable valve member of the valve is shown in this view in its position affording full flow of the heating liquid from the main circuit through a by-pass to the desired instrumentality controlled by the valve.

As appears more fully hereinafter, the such bellows form container 34 or equivalent valve actuating mechanism, controls the position of the plug element 23c to control in turn the flow of the liquid heating medium through the valve body 21, that is to say, the flow of the liquid heating medium through the inflow 24, then into the valve bore 27 and thence either wholly through the port 26 leading to the by-pass connected with the instrumentality served by the modulator valve, as illustrated by Fig. 3, or through the port 25 in return to the main circuit, as illustrated in Fig. 4, or partwise through both ports 26, 25, to effect partial flow through both of the ports 26, 25, as illustrated in Fig. 8. Hence, to effect full flow from the intake port 24 to either of the ports 25 or 26, the plug element 23c of the movable valve member 23 has a peripheral dimension parallel to its axis less than the corresponding dimension of the inner opening of the inlet 24, and a peripheral dimension parallel to its axis greater than each of the corresponding dimensions of the individual ports 25, 26, but not exceeding the sum of the stated dimensions of ports 25, 26, plus the dimension in like direction of the partition 23d of the valve body between the ports 25, 26, to provide, as above referred to, simultaneous flow through both ports 25, 26, and at all stages providing for continuity of flow of the thermal medium through the valve body via its concerned ports.

The bellows form of container 34 may be of any conventional construction; usually its corrugated wall of suitable brass composition defines a central interior of substantially uniform diameter. The terminal edge 34a of such wall of the bellows form of container may be secured to a base plate 35, as by brazing, in this instance with sufficiently high temperature solder to withstand the maximum temperature of the heating medium of the system. Such plate 35 is shown provided with a centrally bored exteriorly extending boss 36, to which is secured the end of the flexible capillary or other suitable tube 37 which is connected with the thermostatic bulb 38, see Figs. 1 and 11, or other suitable temperature responsive device. The plate 35 is shown centrally supported within the casing 22 by securement to the hollow stud 39 which is adjustably mounted within the opening 40 at the outer end of the casing 22, as by securement afforded by screw-threaded connection with the regulating plate 41 and cooperatively with the expansile spring 42 seated between the inner face of the outer wall 22b of the casing 22 and the base plate 35 of the bellows form of container 34, whereby the adjusting plate 41 is adjustably held in rotative relation with respect to the casing 22. Securement of the regulating plate 41 is shown had by means of its guide ring 43, which is secured to or integral with the outer face of the outer end wall 22b of the casing 22, the ring 43 making a close sliding fit with the circular shoulder 41a on the inner face of the adjusting plate 41, and resiliently held in such position by the stated expansile spring 42.

As presently explained the adjusting plate 41 is set in position to regulate the maximum temperature to which the served instrumentality is to be heated.

Figure 2:
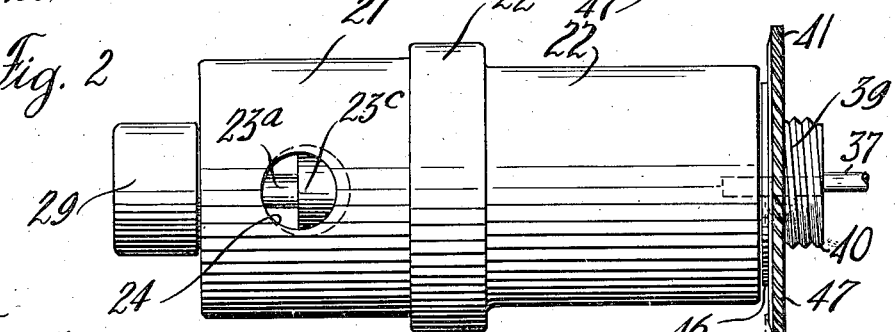
Fig. 2 is an elevational view of the embodiment shown in Fig. 1, as the same appears from the side opposite to that shown in Fig. 1.

The setting of the adjusting plate 41 may be had by any suitable means. Figs. 1, 2 and 3 indicate such setting means comprising an operating wheel 44, handle or the like, which is located to be readily accessible to the user, and appropriately mounted in position. To such setting wheel 44, as shown, is connected a shaft 45 or equivalent, in turn controlling a worm, indicated at 46, see Fig. 2, or other suitable gearing member; such worm is shown meshing with the skew gear, indicated at 47, or other appropriate gearing arrangement, which gear 47 is indicated as mounted at or formed on the peripheral edge of the adjusting plate 41. Associated with such setting wheel, handle or the like is an indicator bearing indications of temperature or other appropriate notations such as "Off"; "Warm"; "Medium"; "Hot"; etc.

Referring to Figs. 3, 4 and 8, preferred embodiments of the invention comprise further an expansible and retractable hollow member 50 of the general formation of a bellows form of container embracing said thermostatically-responsive bellows 34, said hollow member 50 serving as a self-adjusting container for entrapping such portion of the heating medium which seeps through the clearances between the face of the stem 23b of the movable valve member and its guiding bore 31 in the valve body. As shown in Figs. 3, 4 and 8, such entrapping hollow member 50 is sealingly closed at its outer end 50a by brazing or the like to the inner face of the plate 35 to thereby embrace the bellows form of container 34. The inner end 50b of the entrapping member 50 is suitably sealingly closed by any suitable means with respect to the interiors of the valve bodies 21, 22, as by mechanical pressure sealing at the joint afforded by the screw-threaded connection of the bell 22a of the valve body 22 with the valve body 21.

The provision of such self-adjusting entrapping container obviates the use of a gasket or equivalent, and affords shifting movements wholly free of friction of the stem 23b of the valve member, and thus of the movable valve member as an entirety.

In the most preferred forms of the invention, such valve means is combined with thermostatic means which is responsive to the temperature of the instrumentality served by the heating system for automatically controlling the movable valve member to regulate the volume of flow of the heating medium to the heating coils of such instrumentality.

Illustrative of such association, the diagram of Fig. 11 is now referred to.

As is indicated in Fig. 11, illustrating a typical system embracing the generic inventive concept and in particular the employment of a modulator valve pursuant to the invention, such system comprises a boiler 55 typical of any central source of heat; such boiler is shown connected by the pipe 56 to the supply main line 57; the return main line is indicated by 58. The expansion tank 59 is shown connected by the pipe 60 to the main supply line 57. The pump 61 is shown connected to the return line 58 and to the intake of the boiler 55. The indicated heater 62 is typical of any appropriate means for heating the interior of the house or other building, the number of such units 62 being as required. Each such heating unit or group of heater units is controlled by its or their individual modulating valves, indicated by 20, and conforming to the construction of the modulator valve 20 illustrated in Figs. 3, 4 and 8, above referred to, or equivalent. Such modulator valve 20 is connected by the pipe 63 with the supply main line to its inlet port 24 and by the pipe 63a with the inlet of the coil or coils of such unit or group of such units 62, the pipe 64 connecting the outlet of such heating coil or group of coils, in return to the return main line 58; the pipe 64a connects the valve outlet 25 with the return pipe 58. Similarly, the pipe 65 leads from the supply line 57 to the valve 20 and thence to the inlet of the heating coil of refrigerator 66, or group of such refrigerators, the outlet of the heating coil or coils thereof being connected by the pipe 67 to the return main line 58; the outlet 25 of the modulator valve for such refrigerator or group of refrigerators is connected by the pipe 67a to the return pipe 67 and thence to the return main line 58. In a similar manner, the remaining instrumentalities served by the system are respectively connected with the main lines 57, 58.

Typical of the control of the respective instrumentalities served by the system, Fig. 11 includes, in enlarged showing, the modulator valve 20 associated with the oven 68, has its inlet port 24, above referred to, connected with the supply main line 57 as indicated, and its outflow port 26 connected by the pipe 69 to the heating coil or coils 70 of the oven; the pipe 71 connects the outlet of such coil or coils 70 with the return main line 58. The pipe 71a connects the valve outflow port 25 with the return pipe 71, and thence with the return main line 58. The thermostatic bulb 38, referred to generally above, is shown connected by its capillary tube 37 with the temperature-reactive bellows form of container or equivalent of the modulator valve, corresponding to the bellows form of container 34 illustrated in Figs. 3, 4 and 8. The bulb 38 is shown located within the interior of the oven where the baking, broiling or other operation is carried out.

In the operation of regulating the temperature of such oven 68, the regulating plate 41 is set to indicate such temperature. Prior to such setting, such regulating plate 41 is at "0°" reading, in which situation, the bellows form of container effects the positioning by its plunger 33 of the movable valve member 23 as indicated in Fig. 4, namely the plunger 33 immediately abutting the right-hand stem 23b of the movable valve member, thereby compressing the spring 30 and locating the plug element 23c to provide full flow of the heating medium from the intake port 24 through the valve body and thence out the outlet port 25, namely through the pipe 71a, indicated in Fig. 11, in return to the main line 58.

(Figs. 3 and 4 illustrate clearances between the free end of such plunger 33 and the free end of the stem 23b of the movable valve member and also between the face of the base of the plunger 33 and the face of the boss 32; these clearances are purely for graphical clarity.)

Returning to the operation of setting the temperature of the oven in a system typified in Fig. 11, the plate 41 is rotated corresponding to the maximum temperature, thereby causing the plunger 33 to recede from its position shown in Fig. 4 to its position shown in Fig. 3, whereby the movable valve member 23 is released under action of its expansile coil 30 to locate the plug element 23c in its position as indicated in Fig. 3. At this stage, and as fully set forth in connection with the description of Fig. 3, the heating medium passes from its intake port 24 through the body of the modulator valve wholly to its outlet port 26 and thence through the piping 69 to the inlet of the heating coil or coils of the oven 68, and from the outlet of such coil or coils the heating medium flows through the piping 71 to the return main line 58.

In consequence of the heating of the interior of the oven, the temperature of the temperature-responsive liquid within the thermostatic bulb 38 and its capillary tube 37 and within the bellows form of container 34 is progressively raised and accordingly expanded, causing the bellows form of container 34 to expand whereby its plunger 33 engages the free end of the stem 23b of the movable valve member and progressively shifts the plug element 23c toward the left as viewed in Fig. 4 to position the plug element intermediate of the outlet ports 25, 26. Fig. 8 indicates the position of the plug element 23c substantially equally with reference to the valve outlet ports 25, 26. As the temperature within the oven increases further, the expansion of the bellows form of container 34 continues; upon the interior of the oven attaining its maximum temperature regulated by the setting of the regulating plate 41, as above described, the plug element 23c has moved to its full shut-off position with respect to the flow of the heating medium to the heating coils of the oven, as illustrated in Fig. 4.

Upon cooling of the interior of the oven, ensuing in the operation of baking or the like within the oven, and by loss by heat radiation, the plunger 33 recedes from its position shown in Fig. 4 to some intermediate position indicated generally in Fig. 8, thus providing for partial flow of the heating medium to the heating coils of the oven and partial flow in return to return main line. Upon restoration of the full heat set by the regulating plate 41, the shifting of the plug element 23c is reversed to shut off either in full or partially the supply of the medium to the heating coils of the oven. The above or equivalent manner of operation of the modulator valve continues until the baking or other treatment within the oven is completed.

Upon completion of the baking or other treatment within the oven or other instrumentality served by the system, the temperature regulating plate 41 of the modulator valve controlling such instrumentality is moved to its zero position, i. e. its shut-off position, which operation, as above indicated, returns the plunger 33 of the bellows container 34 to its position shown in Fig. 4. It will thus be apparent that the maximum range of reciprocal movement of the movable plug valve assembly 23 is represented by the position of the plunger 33 shown in Fig. 3 as compared with its position shown in Fig. 4; in such range of movement the stem 23a of the movable valve member is maintained within and is guided by the hollow recess 28.

The temperature sensitive liquid of the thermostatic control means may be the same as employed as the heating medium of the heating system.

It will be observed that all joints of the respective modulator valves and of the system of piping are permanently sealed and without the use of packing, stuffing boxes or the like; further, the various movable parts of each modulator valve are wholly enclosed within the valve body and actuated under control without the employment of any shaft or other moved part which extends exteriorly of the valve body: in summary, all joints are self-sealed at all stages of operation, thus ensuring against leakage and consequent loss of the thermal fluid, injury to person, damage to property, etc.

The valve body and its constituent parts may be of any metal which is capable of withstanding the range of temperature employed in the system. Copper, brass, bronze, aluminum, steel, etc., are illustrative of suitable material. Preferably, the material of the valve and the valve parts is selected with respect to the material of the piping and other parts of the system which are exposed to the heating liquid, to avoid wide differences in expansion and contraction, preclude electrolytic action between different metals, and other deteriorating effects. Since present day types of bellows form of containers or equivalent bellows-like formations are made of brass, brass or copper is preferable for the material of the valve and its parts and the piping.

The expansion tank, referred to above, may be installed wherever desired, to position its top sufficiently above the level of the highest point of the entire installation to provide for the necessary expansion of the thermal medium. In installing the system in a home or other building, it is convenient to locate the expansion tank within such building at or toward the top of the building to thereby utilize otherwise unused space. Suitable provision of means is made for the outflow of air from the expansion tank incidental to the expansion of the heating liquid, as by providing a pipe 75 which, as shown in Fig. 11, may be connected with the interior of the expansion tank towards its top and leading to the outer atmosphere, a one-way valve 76, opening solely outwardly, controlling the outflow of the pipe. It is also desirable to provide a vacuum breaker connection between the pipe 75 and the top of the expansion tank as by the pipe 77 incorporating the vacuum breaker 78 connected with the pipe 75 between its outer free end and the valve 76 and communicating with the top of the expansion tank, indicated at 79; the vacuum breaker 78 may be a one-way valve opening solely in the direction toward the interior of the expansion tank.

When it is desired to heat the home or other building by means of conventional radiators and piping, this may be accomplished by the employment of a heat exchange unit, the coil or coils of which are connected with the main line of the above described thermal system, such coil or coils being in heat exchange relation with coil or coils embodying water serving as the thermal fluid of such conventional heating system, and the temperature of such thermal unit controlled by its modulator valve for the range either for the generation of steam or for heated water.

The utilization of tetracresylsilicate as the thermal liquid is advantageous in the circumstance that a leak may occur, in that the stated thermal liquid has a characteristic odor which is readily detectable, and accordingly serves as a self-policing medium in indicating a leak and prompting the repair of such leak.

It will be apparent from the above that the modulator valve is useful in association with systems other than heating liquid systems, as in a system utilizing water as the heating or cooling or other medium, and in certain instances for systems utilizing gas as the thermal or other fluid, in which last named instance suitable provision is made for proper gas-type fit of the movable valve member with respect to the outflow port or ports.

Whereas, I have illustrated and described my invention by reference to typical preferred embodiments of the invention, it will be understood that changes and modifications of the invention may be made without departing from the invention as defined by the appended claim.

I claim:

In a thermostatically actuated valve, a valve body, a centrally disposed chamber in said valve body, inlet and outlet ports communicating with said chamber, a valve member slidably mounted in said chamber and controlling the direction of flow through said ports, a valve stem for actuating said valve member, a thermostatically responsive bellows in engagement with said valve stem, a sealing bellows surrounding said thermostatically responsive bellows and sealed around its open end to said valve body, a plate in engagement with the other end of said sealing bellows, a housing surrounding said sealing bellows and secured to said valve body, the open end of said sealing bellows being sealed to said valve body by said housing, and means for adjusting the position of said plate and of said thermostatically responsive bellows including a threaded hollow stud extending through said housing and secured to said plate, a rotatable adjusting plate threaded upon said stud externally of said housing and a spring surrounding said stud within said housing and engaging said first named plate and said housing.

ORION O. OAKS.

REFERENCES CITED

The following references are of record in the file of this patent:

UNITED STATES PATENTS

| Number | Name | Date |
|---|---|---|
| 1,137,921 | Snediker | May 4, 1915 |
| 1,311,809 | Giesler | July 29, 1919 |
| 1,776,401 | Thompson | Sept. 23, 1930 |
| 1,882,803 | Giesler | Oct. 18, 1932 |
| 1,974,731 | Andersson | Sept. 25, 1934 |
| 2,175,150 | Eggleston | Oct. 3, 1939 |
| 2,240,731 | Van Vulpen | May 6, 1941 |
| 2,264,869 | Beardsley | Dec. 2, 1941 |
| 2,363,294 | Carrier | Nov. 21, 1944 |

FOREIGN PATENTS

| Number | Country | Date |
|---|---|---|
| 437,231 | Great Britain | Oct. 25, 1935 |
| 655,640 | Germany | Jan. 20, 1938 |